United States Patent
He et al.

(10) Patent No.: US 11,421,330 B2
(45) Date of Patent: Aug. 23, 2022

(54) METHODS FOR CARBON DIOXIDE HYDROGENATION

(71) Applicant: Battelle Energy Alliance, LLC, Idaho Falls, ID (US)

(72) Inventors: Ting He, Idaho Falls, ID (US); Dong Ding, Idaho Falls, ID (US); Chenlin Li, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 39 days.

(21) Appl. No.: 16/493,077

(22) PCT Filed: Mar. 15, 2018

(86) PCT No.: PCT/US2018/022603
§ 371 (c)(1),
(2) Date: Sep. 11, 2019

(87) PCT Pub. No.: WO2018/170243
PCT Pub. Date: Sep. 20, 2018

(65) Prior Publication Data
US 2020/0071841 A1    Mar. 5, 2020

Related U.S. Application Data

(60) Provisional application No. 62/472,268, filed on Mar. 16, 2017.

(51) Int. Cl.
*C25B 3/26* (2021.01)
*C25B 3/25* (2021.01)
(Continued)

(52) U.S. Cl.
CPC ............... *C25B 3/25* (2021.01); *C01B 3/045* (2013.01); *C25B 9/23* (2021.01); *C25B 11/04* (2013.01);
(Continued)

(58) Field of Classification Search
CPC ..................................... C25B 3/23; C25B 3/26
(Continued)

(56) References Cited

U.S. PATENT DOCUMENTS

2008/0283411 A1 * 11/2008 Eastman ................... C10G 2/50
205/343
2011/0132770 A1 * 6/2011 Sala ......................... C25B 3/25
205/338
(Continued)

FOREIGN PATENT DOCUMENTS

WO    WO-2015156525 A1 * 10/2015 ............... C25B 1/00

OTHER PUBLICATIONS

Pu et al., "Steam/CO2 Electrolysis in Symmetric Solid Oxide Electrolysis Cell with Barium Cerate-Carbonate Composite Electrolyte," Electrochimica Acta (Feb. 1, 2016), vol. 190, pp. 193-198. (Year: 2016).*

(Continued)

*Primary Examiner* — Edna Wong
(74) *Attorney, Agent, or Firm* — TraskBritt (57) ABSTRACT

A method of carbon dioxide hydrogenation comprises introducing gaseous water to a positive electrode of an electrolysis cell comprising the positive electrode, a negative electrode, and a proton-conducting membrane between the positive electrode and the negative electrode. The proton-conducting membrane comprises an electrolyte material having an ionic conductivity greater than or equal to about 10-2 S/cm at one or more temperatures within a range of from about 150° C. to about 650° C. Carbon dioxide is introduced to the negative electrode of the electrolysis cell. A potential difference is applied between the positive electrode and the negative electrode of the electrolysis cell to generate hydrogen ions from the gaseous water that diffuses through the proton-conducting membrane and hydrogenates (Continued)

the carbon dioxide at the negative electrode. A carbon dioxide hydrogenation system is also described.

15 Claims, 1 Drawing Sheet

(51) Int. Cl.
    *C01B 3/04*         (2006.01)
    *C25B 11/04*       (2021.01)
    *C25B 13/04*       (2021.01)
    *C25B 9/23*        (2021.01)

(52) U.S. Cl.
    CPC ...... *C25B 13/04* (2013.01); *C01B 2203/0272* (2013.01); *C01B 2203/067* (2013.01)

(58) Field of Classification Search
    USPC ................ 205/413, 446, 448, 450, 455, 462
    See application file for complete search history.

(56) References Cited

U.S. PATENT DOCUMENTS

2014/0284220 A1*   9/2014   Sala ........................ C25B 1/04
                                                       205/629
2019/0284048 A1*   9/2019   Kjolseth .................. C01B 3/26

OTHER PUBLICATIONS

Wu et al., "Electrochemical Conversion of H2O/CO2 to Fuel in a Proton-Conducting Solid oxide Electrolyser," Journal of Power Sources (Jun. 15, 2013), vol. 232, pp. 187-192. (Year: 2013).*
Norby, "Advances in Proton Ceramic Fuel Cells, Steam Electrolyzers, and Dehydrogenation Reactors Based on Materials and Process Optimizations," ECS Transactions (Aug. 31, 2017), vol. 80, No. 9, pp. 23-32. (Year: 2017).*

* cited by examiner

METHODS FOR CARBON DIOXIDE HYDROGENATION

CROSS-REFERENCE TO RELATED APPLICATIONS

This application is a national phase entry under 35 U.S.C. § 371 of International Patent Application PCT/US2018/022603, filed Mar. 15, 2018, designating the United States of America and published as International Patent Publication WO 2018/170243 A1 on Sep. 20, 2018, which claims the benefit of the filing date under Article 8 of the Patent Cooperation Treaty to U.S. Provisional Patent Application Ser. No. 62/472,268, filed Mar. 16, 2017, for "METHODS AND SYSTEMS FOR CARBON DIOXIDE HYDROGENATION."

GOVERNMENT RIGHTS

This invention was made with government support under Contract No. DE-AC07-05-ID14517 awarded by the United States Department of Energy. The government has certain rights in the invention.

TECHNICAL FIELD

The disclosure, in various embodiments, relates to methods and systems for carbon dioxide ($CO_2$) hydrogenation using water electrolysis.

BACKGROUND

Increased combustion of fossil fuels (e.g., coal, crude oil, natural gas, etc.) driven by increased global energy demands has resulted in augmented $CO_2$ emissions into the atmosphere, and $CO_2$ emissions are projected to increase in the future. Concern over the possible negative effects (e.g., global warming effects) of escalating atmospheric $CO_2$ concentrations have compelled new approaches toward reducing, sequestering, storing, and/or utilizing emitted $CO_2$.

$CO_2$ can be utilized to synthesize a variety of commodity chemicals. For example, $CO_2$ can be reacted with hydrogen gas in the presence of at least one catalyst to hydrogenate the $CO_2$ and produce formic acid, which may, in turn, be used to produce additional commodity chemicals (e.g., formaldehyde, methanol, other alcohols, formates, carboxylic acids, esters, methylated amines, formamides, aldehydes, etc.) through conventional reaction mechanisms.

Unfortunately, conventional processes of producing commodity chemicals from $CO_2$ can be energy intensive (e.g., generating more $CO_2$ than that consumed to produce the commodity chemicals) and/or prohibitively expensive (e.g., employing costly catalyst materials to effectuate desirable reaction kinetics). For example, one method of producing hydrogen gas for use in hydrogenating $CO_2$ is through water electrolysis, wherein water is decomposed into oxygen gas and hydrogen gas through the application of electric current to the water across electrodes of opposite polarity. Conventional methods of enhancing hydrogen gas production through water electrolysis have focused on improving water electrolysis reaction kinetics and thermodynamics through high temperature (e.g., greater than about 750° C.) processes, and/or on reducing the thermal energy required to facilitate water electrolysis through the use of low temperature processes (e.g., less than about 150° C.) and/or catalyst materials. However, conventional high temperature water electrolysis processes can result in undesirable energy (e.g., thermal energy) expenditures and/or cell degradation (e.g., thermal degradation), and conventional low temperature water electrolysis processes can suffer from poor reaction kinetics and/or the need to employ costly catalyst materials to improve the poor reaction kinetics.

It would be desirable to have new methods, systems, and apparatuses for $CO_2$ hydrogenation using water electrolysis. It would further be desirable if the new methods, systems, and apparatuses facilitated increased chemical production efficiency, increased operational life, and were relatively inexpensive and simple in operation.

BRIEF SUMMARY

Embodiments described herein include methods and systems for carbon dioxide hydrogenation using water electrolysis. In accordance with one embodiment described herein, a method of carbon dioxide hydrogenation comprises introducing gaseous water to a positive electrode of an electrolysis cell comprising the positive electrode, a negative electrode, and a proton-conducting membrane between the positive electrode and the negative electrode. The proton-conducting membrane comprises an electrolyte material having an ionic conductivity greater than or equal to about $10^{-2}$ S/cm at one or more temperatures within a range of from about 150° C. to about 650° C. Carbon dioxide is introduced to the negative electrode of the electrolysis cell. A potential difference is applied between the positive electrode and the negative electrode of the electrolysis cell to generate hydrogen ions from the gaseous water that diffuse through the proton-conducting membrane and hydrogenate the carbon dioxide at the negative electrode.

In additional embodiments, a carbon dioxide hydrogenation system comprises a source of liquid water, a source of carbon dioxide, a steam generator configured and positioned to receive a liquid water stream from the source of liquid water and to generate a gaseous water stream therefrom, and an electrochemical apparatus in fluid communication with the steam generator and the source of carbon dioxide. The electrochemical apparatus comprises a housing structure and an electrolysis cell. The housing structure is configured and positioned to receive the gaseous water stream from the steam generator into a first region of an internal chamber thereof and to receive a $CO_2$ stream from the source of carbon dioxide into a second region of the internal chamber thereof. The electrolysis cell is within the internal chamber of the housing structure and comprises a positive electrode, a negative electrode, and a proton-conducting membrane between the positive electrode and the negative electrode. The proton-conducting membrane comprises an electrolyte material having an ionic conductivity greater than or equal to about $10^{-2}$ S/cm at one or more temperatures within a range of from about 150° C. to about 650° C.

DETAILED DESCRIPTION

Methods and systems for hydrogenating $CO_2$ using water electrolysis are disclosed. In some embodiments, a method of hydrogenating $CO_2$ includes forming a gaseous water ($H_2O$) stream from a liquid $H_2O$ stream, and then directing the gaseous $H_2O$ stream into an electrochemical apparatus including an electrolysis cell therein. The electrolysis cell comprises a positive electrode (anode), a negative electrode (cathode), and a proton-conducting membrane between the positive electrode and the negative electrode. The proton-conducting membrane comprises an electrolyte material having an ionic conductivity greater than or equal to about $10^{-2}$ Siemens per centimeter (S/cm) at one or more temperatures within a range of from about 150° C. to about 650° C. Electrical current is applied to the gaseous $H_2O$ across the positive electrode and the negative electrode of the electrolysis cell at a temperature within the range of from about 150° C. to about 650° C. to generate $O_2$ gas, hydrogen ions ($H^+$) (i.e., protons), and electrons ($e^-$). The generated $H^+$ permeate across the proton-conducting membrane of the electrolysis cell and react with supplied $CO_2$, $e^-$, and, optionally, one or more other materials (e.g., $CO_2$ hydrogenation products, other molecules, etc.) to form one or more desirable materials (e.g., commodity chemicals). The methods, systems, and apparatuses of the disclosure may be more efficient (e.g., increasing material synthesis efficiency; reducing equipment, material, and/or energy requirements; etc.), more durable, and/or less complicated as compared to conventional methods, conventional systems, and conventional apparatuses for synthesizing desirable materials through $CO_2$ hydrogenation.

The following description provides specific details, such as material compositions and processing conditions (e.g., temperatures, pressures, flow rates, etc.) in order to provide a thorough description of embodiments of the disclosure. However, a person of ordinary skill in the art will understand that the embodiments of the disclosure may be practiced without necessarily employing these specific details. Indeed, the embodiments of the disclosure may be practiced in conjunction with conventional systems and methods employed in the industry. In addition, only those process components and acts necessary to understand the embodiments of the present disclosure are described in detail below. A person of ordinary skill in the art will understand that some process components (e.g., pipelines, line filters, valves, temperature detectors, flow detectors, pressure detectors, and the like) are inherently disclosed herein and that adding various conventional process components and acts would be in accord with the disclosure. In addition, the drawing accompanying the disclosure is for illustrative purposes only, and is not meant to be an actual view of any particular material, device, or system.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the FIGURE. Unless otherwise specified, the spatially relative terms are intended to encompass different orientations of the materials in addition to the orientation depicted in the FIGURE. For example, if materials in the FIGURE are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the singular forms "a," "an," and "the" are intended to include the plural forms as well, unless the context clearly indicates otherwise.

As used herein, "and/or" includes any and all combinations of one or more of the associated listed items.

As used herein, the term "configured" refers to a size, shape, material composition, material distribution, and arrangement of one or more of at least one structure and at least one apparatus facilitating operation of one or more of the structure and the apparatus in a pre-determined way.

As used herein, the term "substantially" in reference to a given parameter, property, or condition means and includes to a degree that one of ordinary skill in the art would understand that the given parameter, property, or condition is met with a degree of variance, such as within acceptable tolerances. By way of example, depending on the particular parameter, property, or condition that is substantially met, the parameter, property, or condition may be at least 90.0 percent met, at least 95.0 percent met, at least 99.0 percent met, at least 99.9 percent met, or even 100.0 percent met.

As used herein, "about" or "approximately" in reference to a numerical value for a particular parameter is inclusive of the numerical value and a degree of variance from the numerical value that one of ordinary skill in the art would understand is within acceptable tolerances for the particular parameter. For example, "about" or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, the term "negative electrode" means and includes an electrode having a relatively lower electrode potential in an electrochemical cell (i.e., lower than the electrode potential in a positive electrode therein). Conversely, as used herein, the term "positive electrode" means and includes an electrode having a relatively higher electrode potential in an electrochemical cell (i.e., higher than the electrode potential in a negative electrode therein).

As used herein the term "electrolyte" means and includes an ionic conductor, which can be in a solid state, a liquid state, or a gas state (e.g., plasma).

As used herein, the term "compatible" means that a material does not undesirably react, decompose, or absorb another material, and also that the material does not undesirably impair the chemical and/or mechanical properties of the another material.

Figure 1:
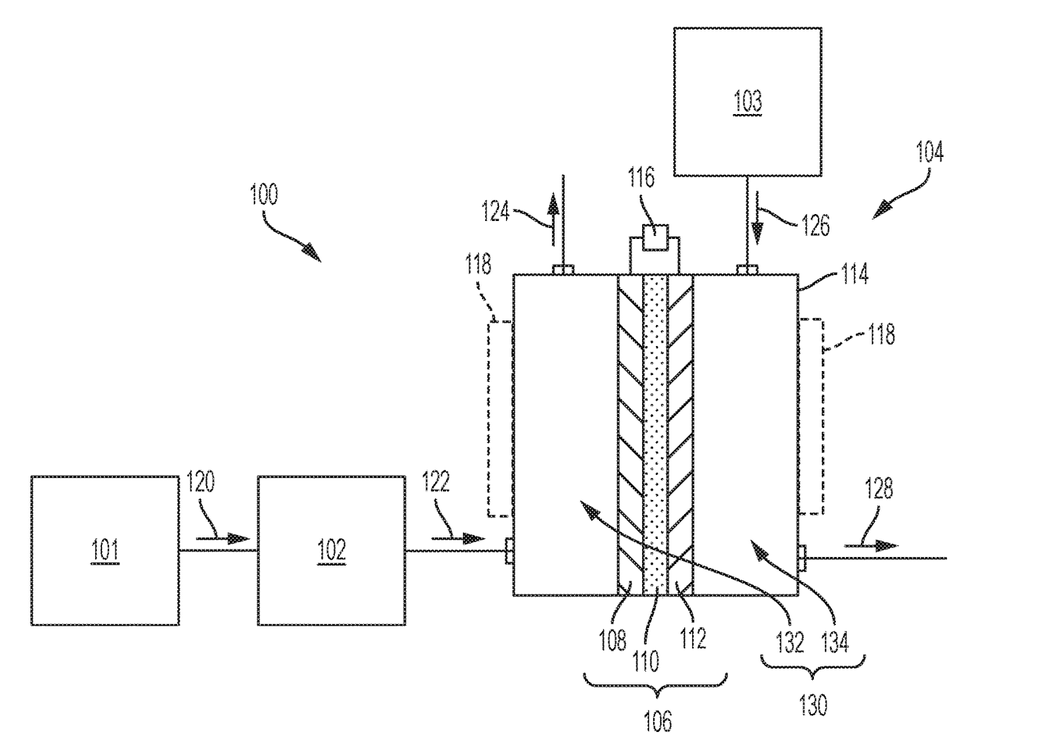
FIG. 1 is a simplified schematic view of a carbon dioxide hydrogenation system, in accordance with an embodiment of the disclosure.

An embodiment of the disclosure will now be described with reference to FIG. 1, which schematically illustrates a $CO_2$ hydrogenation system 100. The $CO_2$ hydrogenation system 100 may be used to convert $H_2O$ and $CO_2$ into $O_2$ and one or more desirable products (e.g., commodity chemicals). As shown in FIG. 1, the $CO_2$ hydrogenation system 100 may include at least one liquid $H_2O$ source 101 (e.g., containment vessel), at least one steam generator 102 downstream of the liquid $H_2O$ source 101, at least one $CO_2$ source 103 (e.g., containment vessel), and at least one electrochemical apparatus 104 in fluid communication with each of the liquid $H_2O$ source 101, the steam generator 102, and the $CO_2$ source 103. The electrochemical apparatus 104 includes a housing structure 114, and at least one electrolysis cell 106 contained within the housing structure 114. The electrolysis cell 106 is electrically connected (e.g., coupled) to a power source 116, and includes a positive electrode 108 (e.g., anode), a negative electrode 112 (e.g., cathode), and a proton-conducting membrane 110 between the positive electrode 108 and the negative electrode 112. As shown in FIG. 1, optionally, the $CO_2$ hydrogenation system 100 may also include at least one heating apparatus 118 operatively associated with the electrochemical apparatus 104.

During use and operation, the $CO_2$ hydrogenation system 100 converts a liquid $H_2O$ stream 120 from the liquid $H_2O$ source into a gaseous $H_2O$ (e.g., steam) stream 122 within the steam generator 102, and then directs the gaseous $H_2O$ stream 122 into the electrochemical apparatus 104 to interact with the positive electrode 108 of the electrolysis cell 106. A potential difference (e.g., voltage) is applied between the positive electrode 108 and the negative electrode 112 of the electrolysis cell 106 by the power source 116 so that as the gaseous $H_2O$ interacts with the positive electrode 108, H atoms of the gaseous $H_2O$ release their electrons (e) to generate $O_{2(g)}$, hydrogen ions ($H^+$) (i.e., protons), and electrons (e–) according to the following equation:

(1).

The generated $H^+$ permeate (e.g., diffuse) across the proton-conducting membrane 110 to the negative electrode 112, the generated $e^-$ are directed to the power source 116 through external circuitry, and the generated $O_{2(g)}$ exits the electrochemical apparatus 104 as a gaseous $O_2$ stream 124. At the negative electrode 112, the generated $H^+$ exiting the proton-conducting membrane 110 reacts with $CO_2$ delivered into the electrochemical apparatus 104 from a $CO_2$ stream 126 directed from the $CO_2$ source 103, $e^-$ received from the power source 116, and, optionally, one or more other materials (e.g., $CO_2$ hydrogenation products previously formed through reactions between $H^+$, $e^-$, and one or more of $CO_2$ and other $CO_2$ hydrogenation products; reaction products of $CO_2$ and one or more of $CO_2$ hydrogenation products and other molecules delivered to the negative electrode 112 side of the electrolysis cell 106; etc.) to form one or more desirable products (e.g., one or more of an alcohol, an aldehyde, a carboxylic acid, a formate, a methylated amine, formaldehyde, formic acid, a formamide, etc.) that then exit the electrochemical apparatus 104 as a product stream 128. The materials synthesized at the negative electrode 112 at least partially depend on the diffusivity (e.g., diffusion rate) of the generated $H^+$ through the proton-conducting membrane 110.

Unlike conventional methods of hydrogenating $CO_2$ that react $CO_2$ (and/or one or more of $CO_2$ hydrogenation products and derivatives of $CO_2$ hydrogenation products) with hydrogen gas ($H2_{(g)}$, the $CO_2$ hydrogenation system 100 directly reacts $H^+$ with the $CO_2$ (and/or one or more of $CO_2$ hydrogenation products and derivatives of $CO_2$ hydrogenation products) to form one or more desirable products. Accordingly, the formation of $CO_2$ hydrogenation products at the negative electrode 112 is not constrained (e.g., limited) by the previous formation of $H_{2(g)}$ through a hydrogen evolution reaction (HER). As a non-limiting example, at the negative electrode 112, $CO_2$ from the $CO_2$ stream 126 may react with generated $H^+$ exiting the proton-conducting membrane 110 and $e^-$ received from the power source 116 to produce formic acid according to the following equation:

As another non-limiting example, formic acid produced at the negative electrode 112 according to the reaction of Equation (2) above may react with additional generated $H^+$ exiting the proton-conducting membrane 110 and additional $e^-$ received from the power source 116 to produce formaldehyde according to the following equation:

(3)

As a further non-limiting example, formaldehyde produced at the negative electrode 112 according to the reaction of Equation (3) above may directly react with yet additional generated $H^+$ exiting the proton-conducting membrane 110 and yet additional $e^-$ received from the power source 116 to produce methanol according to the following equation:

(4)

Of course, the products that may be synthesized using the $CO_2$ hydrogenation system 100 of the disclosure are not limited to formic acid, formaldehyde, and methanol. Rather, it will be readily apparent to one of ordinary skill in the art that the methods, systems, and apparatuses described herein may be used to synthesize a wide variety of products through hydrogenation of one or more of $CO_2$, $CO_2$ hydrogenation products, and derivatives of $CO_2$ hydrogenation products. By way of non-limiting example, the $CO_2$ hydrogenation system 100 may be used to form one or more of formic acid, formaldehyde, methanol, a formate, a methylated amine, an alcohol other than methanol, a carboxylic acid, a formamide, and an aldehyde, which have the general structures shown below:

(2)

where each R may individually be hydrogen; a substituted or unsubstituted alkyl group (e.g., linear, branched, or cyclic) containing from 1 carbon atom to 10 carbon atoms; or a substituted or unsubstituted aryl group or heteroaryl group. If a group is substituted, the substituent may be an alkyl, alkenyl, alkynl, alkyl halide, aryl, aryl halide, heteroaryl, non-aromatic ring, Si(alkyl)$_3$, Si(alkoxy)$_3$, alkoxy, amino, ester, amide, thioether, alkylcarbonate, or thioester group. Additional products (e.g., methane ($CH_4$)) may also be synthesized through reactions between $CO_2$ from the $CO_2$ stream 126, the generated $H^+$ exiting the proton-conducting membrane 110, and the $e^-$ received from the power source 116.

With continued reference to FIG. 1, the steam generator 102 comprises at least one apparatus configured and operated to heat the liquid $H_2O$ stream 120 to a temperature sufficient to generate the gaseous $H_2O$ stream 122. By way of non-limiting example, the steam generator 102 may comprise a boiler apparatus configured and operated to heat the liquid $H_2O$ stream 120 to a temperature greater than or equal to about 100° C. In some embodiments, the steam generator 102 is configured and operated to convert the liquid $H_2O$ stream 120 into a gaseous $H_2O$ stream 122 having a temperature within a range of an operating temperature of the electrolysis cell 106 of the electrochemical apparatus 104, such as a temperature within a range of from about 150° C. to about 650° C. In some embodiments, the steam generator 102 is configured and operated to convert the liquid $H_2O$ stream 120 into a gaseous $H_2O$ stream 122 having a temperature below the operating temperature of the electrolysis cell 106. In such embodiments, the heating apparatus 118 may be employed to further heat the gaseous $H_2O$ stream 122 to the operational temperature of the electrolysis cell 106, as described in further detail below.

The liquid $H_2O$ stream 120 entering the steam generator 102 and the gaseous $H_2O$ stream 122 exiting the steam generator 102 may each individually exhibit any pressure and any flow rate facilitating the hydrogenation of one or more of $CO_2$ from the $CO_2$ stream 126, $CO_2$ hydrogenation products, and/or derivatives of $CO_2$ hydrogenation products (e.g., reaction products of $CO_2$ hydrogenation products and other molecules) within the electrochemical apparatus 104 to synthesize one or more desired products (e.g., one or more commodity chemicals, such as one or more of formic acid, formaldehyde, an alcohol, a formate, a methylated amine, a carboxylic acid, a formamide, an aldehyde, etc.). One or more apparatuses (e.g., pumps, compressors, expanders, mass flow control devices, etc.) may be employed within the $CO_2$ hydrogenation system 100 to adjust the pressure(s) and/or flow rate(s) of the liquid $H_2O$ stream 120 entering the steam generator 102 and/or the pressure(s) and/or flow rate(s) of the gaseous $H_2O$ stream 122 exiting the steam generator 102.

A single (e.g., only one) liquid $H_2O$ stream 120 may be directed into the steam generator 102 and a single gaseous $H_2O$ stream 122 may exit the steam generator 102, or multiple (e.g., more than one) liquid $H_2O$ streams 120 may be directed into the steam generator 102 and/or multiple gaseous $H_2O$ streams 122 may exit the exit the steam generator 102. If multiple liquid $H_2O$ streams 120 are directed into the steam generator 102, each of the multiple liquid $H_2O$ streams 120 may exhibit substantially the same properties (e.g., substantially the same temperature, substantially the same pressure, substantially the same flow rate, etc.), or at least one of the multiple liquid $H_2O$ streams 120 may exhibit one or more different properties (e.g., a different temperature, a different pressure, a different flow rate, etc.) than at least one other of the multiple liquid $H_2O$ streams 120. In addition, if multiple gaseous $H_2O$ streams 122 exit the steam generator 102, each of the multiple gaseous $H_2O$ streams 122 may exhibit substantially the same properties (e.g., substantially the same temperature, substantially the same pressure, substantially the same flow rate, etc.), or at least one of the multiple gaseous $H_2O$ streams 122 may exhibit one or more different properties (e.g., a different temperature; a different pressure; a different flow rate; etc.) than at least one other of the multiple gaseous $H_2O$ streams 122.

The $CO_2$ stream 126 entering the electrochemical apparatus 104 may be formed of and include $CO_2$. The $CO_2$ may be present in the $CO_2$ stream 126 in one or more of gaseous phase and a liquid phase. The phase(s) of the $CO_2$ (and, hence, a temperature and a pressure of the $CO_2$ stream 126) may at least partially depend on the operating temperature of the electrolysis cell 106 of the electrochemical apparatus 104. For example, at operating temperatures less than or equal to about 250° C. (e.g., within a range of from about 150° C. to about 250° C.), the $CO_2$ may be present in the $CO_2$ stream 126 in a liquid phase (e.g., $CO_2$ dissolved in an ionic liquid), a gaseous phase, or combination thereof. As another example, at operating temperatures greater than about 250° C. (e.g., greater than about 250° C. and less than or equal to about 650°), the $CO_2$ may be present in the $CO_2$ stream 126 in a gaseous phase. The $CO_2$ stream 126 may only include $CO_2$, or may include $CO_2$ and one or more other materials (e.g., inert materials; materials to be reacted with $CO_2$ hydrogenation products to form desired products; etc.). In some embodiments, the $CO_2$ stream 126 is substantially free of materials other than $CO_2$. One or more apparatuses (e.g., heat exchangers, pumps, compressors, expanders, mass flow control devices, etc.) may be employed within the $CO_2$ hydrogenation system 100 to adjust the one or more of the temperature, pressure, and flow rate of the $CO_2$ stream 126 delivered into the electrochemical apparatus 104.

A single (e.g., only one) $CO_2$ stream 126 may be directed into the electrochemical apparatus 104, or multiple (e.g., more than one) $CO_2$ streams 126 may be directed into the electrochemical apparatus 104. If multiple $CO_2$ streams 126 are directed into the electrochemical apparatus 104, each of the multiple $CO_2$ streams 126 may exhibit substantially the same properties (e.g., substantially the same material composition, substantially the same temperature, substantially the same pressure, substantially the same flow rate, etc.), or at least one of the multiple $CO_2$ streams 126 may exhibit one or more different properties (e.g., a different material composition, a different temperature, a different pressure, a different flow rate, etc.) than at least one other of the multiple $CO_2$ streams 126.

The heating apparatus 118, if present, may comprise at least one apparatus (e.g., one or more of a combustion heater, an electrical resistance heater, an inductive heater, and an electromagnetic heater) configured and operated to heat one or more of the gaseous $H_2O$ stream 122, the $CO_2$ stream 126, and at least a portion of the electrochemical apparatus 104 to an operating temperature of the electrochemical apparatus 104. The operating temperature of the electrochemical apparatus 104 may at least partially depend on a material composition of the proton-conducting membrane 110 of the electrolysis cell 106 thereof, as described in further detail below. In some embodiments, the heating apparatus 118 heats one or more of the gaseous $H_2O$ stream 122, the $CO_2$ stream 126, and at least a portion of the electrochemical apparatus 104 to a temperature within a range of from about 150° C. to about 650° C. In additional embodiments, such as in embodiments wherein a temperature of the gaseous $H_2O$ stream 122 exiting the steam generator 102 is already within the operating temperature range of the electrolysis cell 106 of the electrochemical apparatus 104, the heating apparatus 118 may be omitted (e.g., absent) from the $CO_2$ hydrogenation system 100.

With continued reference to FIG. 1, the electrochemical apparatus 104, including the housing structure 114 and the electrolysis cell 106 thereof, is configured and operated to form the product stream 128 including one or more $CO_2$ hydrogenation products (and/or derivatives thereof) from the gaseous $H_2O$ stream 122 and the $CO_2$ stream 126. The housing structure 114 may exhibit any shape (e.g., a tubular shape, a quadrilateral shape, a spherical shape, a semispherical shape, a cylindrical shape, a semi-cylindrical shape, truncated versions thereof, or an irregular shape) and size able to contain (e.g., hold) the electrolysis cell 106 therein, to receive and direct the gaseous $H_2O$ stream 122 to the positive electrode 108 of the electrolysis cell 106, to direct the $CO_2$ stream 126 to the negative electrode 112 of the electrolysis cell 106, and to direct the $CO_2$ hydrogenation products (and/or derivatives thereof) formed at the negative electrode 112 of the electrolysis cell 106 away from the electrochemical apparatus 104 as the product stream 128. In addition, the housing structure 114 may be formed of and include any material (e.g., glass, metal, alloy, polymer, ceramic, composite, combination thereof, etc.) compatible with the operating conditions (e.g., temperatures, pressures, etc.) of the electrochemical apparatus 104.

The housing structure 114 may at least partially define at least one internal chamber 130 at least partially surrounding the electrolysis cell 106. The electrolysis cell 106 may serve as a boundary between a first region 132 (e.g., an anodic region) of the internal chamber 130 configured and positioned to receive the gaseous $H_2O$ stream 122 and to direct the gaseous $O_2$ stream 124 from the electrochemical apparatus 104, and a second region 134 (e.g., a cathodic region) of the internal chamber 130 configured and positioned receive the $CO_2$ stream 126 and to direct the product stream 128 from the electrochemical apparatus 104. $H_2O_{(g)}$ from the gaseous $H_2O$ stream 122 may be substantially limited to the first region 132 of the internal chamber 130 by the configurations and positions of the housing structure 114 and the electrolysis cell 106, such that the second region 134 of the internal chamber 130 is substantially free of $H_2O_{(g)}$. Accordingly, the positive electrode 108 may be exposed to the $H_2O_{(g)}$ from the gaseous $H_2O$ stream 122 without exposing the negative electrode 112 to the $H_2O_{(g)}$ from the gaseous $H_2O$ stream 122. Keeping the second region 134 of the internal chamber 130 substantially free of the $H_2O_{(g)}$ may circumvent at least some additional processing of the $CO_2$ hydrogenation products (and/or derivatives thereof) that may otherwise be necessary if the $H_2O_{(g)}$ was provided within the second region 134 of the internal chamber 130.

As shown in FIG. 1, the positive electrode 108 and the negative electrode 112 of the electrolysis cell 106 are electrically coupled to a power source 116, and the proton-conducting membrane 110 is disposed on and between the positive electrode 108 and the negative electrode 112. The proton-conducting membrane 110 is configured and formulated to conduct $H^+$ from the positive electrode 108 to the negative electrode 112, while electrically insulating the negative electrode 112 from the positive electrode 108 and preventing the migration of gaseous materials (e.g., $O_{2(g)}$, $H_2O_{(g)}$ therethrough. Electrons generated at the positive electrode 108 through the reaction of Equation (1) described above may, for example, flow from the positive electrode 108 into a negative current collector, through the power source 116 and a positive electrode current collector, and into the negative electrode 112 to facilitate the synthesis of $CO_2$ hydrogenation products (and/or derivatives thereof) at the negative electrode 112.

The proton-conducting membrane 110 may be formed of and include at least one electrolyte material exhibiting an ionic conductivity (e.g., $H^+$ conductivity) greater than or equal to about $10^{-2}$ S/cm (e.g., within a range of from about $10^{-2}$ S/cm to about 1 S/cm) at one or more temperatures within a range of from about 150° C. to about 650° C. (e.g., from about 200° C. to about 600° C.). In addition, the electrolyte material may be formulated to remain substantially adhered (e.g., laminated) to the positive electrode 108 and the negative electrode 112 at relatively high current densities, such as at current densities greater than or equal to about 0.1 amperes per square centimeter ($A/cm^2$) (e.g., greater than or equal to about 0.5 $A/cm^2$, greater than or equal to about 1.0 $A/cm^2$, greater than or equal to about 2.0 $A/cm^2$, etc.). For example, the proton-conducting membrane 110 may comprise one or more of a perovskite material, a solid acid material, and a polybenzimidazole (PBI) material. The material composition of the proton-conducting membrane 110 may provide the proton-conducting membrane 110 with enhanced ionic conductivity at a temperature within the range of from about 150° C. to about 650° C. as compared to conventional membranes (e.g., membranes employing conventional electrolyte materials, such as yttria-stabilized zirconia (YSZ)) of conventional electrolysis cells. By way of non-limiting example, the electrolyte material (e.g., perovskite material, solid acid material, PBI material) of the proton-conducting membrane 110 may have orders of magnitude higher ionic conductivity than YSZ at operational temperatures thereof within the range of from about 150° C. to about 650° C.

In some embodiments, the proton-conducting membrane 110 is formed of and includes at least one perovskite material having an operational temperature (e.g., a temperature at which the $H^+$ conductivity of the perovskite material is greater than or equal to about $10^{-2}$ S/cm, such as within a range of from about $10^{-2}$ S/cm to about $10^{-1}$ S/cm) within a range of from about 350° C. to about 650° C. By way of non-limiting example, the proton-conducting membrane 110 may comprise one or more of a yttrium- and ytterbium-doped barium-zirconate-cerate (BZCYYb), a yttrium- and ytterbium-doped barium-strontium-niobate (BSNYYb), doped barium-cerate ($BaCeO_3$) (e.g., yttrium-doped $BaCeO_3$ (BCY)), doped barium-zirconate ($BaZrO_3$) (e.g., yttrium-doped $BaCeO_3$ (BZY)), barium-yttrium-stannate ($Ba_2(YSn)O_{5.5}$); and barium-calcium-niobate ($Ba_3(CaNb_2)O_9$). In some embodiments, the proton-conducting membrane 110 comprises BZCYYb.

In further embodiments, the proton-conducting membrane 110 is formed of and includes at least one solid acid material having an operational temperature (e.g., a temperature at which the $H^+$ conductivity of the solid acid material is greater than or equal to about $10^{-2}$ S/cm, such as within a range of from about $10^{-2}$ S/cm to about 1 S/cm) within a range of from about 200° C. to about 400° C. By way of non-limiting example, the proton-conducting membrane 110 may comprise a solid acid phosphate material, such as solid acid cesium dihydrogen phosphate ($CsH_2PO_4$). The solid acid material may be doped (e.g., doped $CsH_2PO_4$), or may be undoped (e.g., undoped $CsH_2PO_4$). In some embodiments, the proton-conducting membrane 110 comprises $CsH_2PO_4$.

In additional embodiments, the proton-conducting membrane 110 is formed of and includes at least one PBI material having an operational temperature (e.g., a temperature at which the $H^+$ conductivity of the PBI material is greater than or equal to about $10^{-2}$ S/cm, such as within a range of from about $10^{-2}$ S/cm to about 1 S/cm) within a range of from about 150° C. to about 250° C. By way of non-limiting example, the proton-conducting membrane 110 may comprise a doped PBI, such as phosphoric acid ($H_3PO_4$) doped PBI. In some embodiments, the proton-conducting membrane 110 comprises $H_3PO_4$-doped PBI.

The proton-conducting membrane 110 may be substantially homogeneous or may be substantially heterogeneous. As used herein, the term "homogeneous" means amounts of a material do not vary throughout different portions (e.g., different lateral and longitudinal portions) of a structure. Conversely, as used herein, the term "heterogeneous" means amounts of a material vary throughout different portions of a structure. Amounts of the material may vary stepwise (e.g., change abruptly), or may vary continuously (e.g., change progressively, such as linearly, parabolically) throughout different portions of the structure. In some embodiments, the proton-conducting membrane 110 is substantially homogeneous. In additional embodiments, the proton-conducting membrane 110 is heterogeneous. The proton-conducting membrane 110 may, for example, be formed of and include a stack of at least two (e.g., at least three, at least four, etc.) different materials. As a non-limiting example, the proton-conducting membrane 110 may comprise a stack of at least two (e.g., at least three, at least four, etc.) different perovskite materials individually having an operational temperature within a range of from about 350° C. to about 650° C. As another non-limiting example, the proton-conducting membrane 110 may comprise a stack of at least two (e.g., at least three, at least four, etc.) different solid acid materials individually having an operational temperature within a range of from about 200° C. to about 400° C. As a further non-limiting example, the proton-conducting membrane 110 may comprise a stack of at least two (e.g., at least three, at least four, etc.) different PBI materials individually having an operational temperature within a range of from about 150° C. to about 250° C.

The proton-conducting membrane 110 may exhibit any desired dimensions (e.g., length, width, thickness) and any desired shape (e.g., a cubic shape, cuboidal shape, a tubular shape, a tubular spiral shape, a spherical shape, a semispherical shape, a cylindrical shape, a semi-cylindrical shape, a conical shape, a triangular prismatic shape, a truncated version of one or more of the foregoing, and irregular shape). The dimensions and the shape of the proton-conducting membrane 110 may be selected such that the proton-conducting membrane 110 substantially intervenes between opposing surfaces of the positive electrode 108 and the negative electrode 112, and exhibits an $H^+$ conductivity greater than or equal to about $10^{-2}$ S/cm (e.g., from about $10^{-2}$ S/cm to about 1 S/cm) at a temperature within a range of from about 150° C. to about 650° C. A thickness of the proton-conducting membrane 110 may be within a range of from about 5 micrometers (μm) to about 1000 μm, and may at least partially depend on the material composition of the proton-conducting membrane 110. For example, a proton-conducting membrane 110 formed of and including at least one perovskite material may have a thickness with a range of from about 5 μm to about 1000 μm; a proton-conducting membrane 110 formed of and including at least one solid acid material may have a thickness with a range of from about 5 μm to about 1000 μm; and a proton-conducting membrane 110 formed of and including at least one PBI material may have a thickness with a range of from about 50 μm to about 1000 μm.

The positive electrode 108 and the negative electrode 112 may individually be formed of and include at least one material compatible with the material composition of the proton-conducting membrane 110 and the operating conditions (e.g., temperature, pressure, current density, etc.) of the electrolysis cell 106, and facilitating the formation of the product stream 128 and the gaseous $O_2$ stream 124 from the gaseous $H_2O$ stream 122 and the $CO_2$ stream 126 at an operational temperature within the range of from about 150° C. to about 650° C. Accordingly, the material compositions of the positive electrode 108 and the negative electrode 112 may be selected relative to one another, the material composition of the proton-conducting membrane 110, and the operating conditions of the electrolysis cell 106.

As a non-limiting example, if the proton-conducting membrane 110 comprises a perovskite material (e.g., a BZCYYb, a BSNYYb, a doped $BaCeO_3$, a doped $BaZrO_3$, $Ba_2(YSn)O_{5.5}$, $Ba_3(CaNb_2)O_9$, etc.) having an operational temperature within a range of from about 350° C. to about 650° C., the positive electrode 108 and negative electrode 112 may each individually comprise other perovskite materials compatible with the perovskite material of the proton-conducting membrane 110. The positive electrode 108 may, for example, comprise one or more of a double perovskite material, such as $MBa_{1-x}Sr_xCo_{2-y}Fe_yO_{5+\delta}$, wherein x and y are dopant levels, δ is the oxygen deficit, and M is Pr, Nd, or Sm (e.g., $PrBa_{0.5}Sr_{0.5}Co_{1.5}Fe_{0.5}O_{5+\delta}$, $NdBa_{0.5}Sr_{0.5}Co_{1.5}Fe_{0.5}O_{5+\delta}$, $SmBa_{0.5}Sr_{0.5}Co_{1.5}Fe_{0.5}O_{5+\delta}$); a single perovskite material, such as $Sm_{1-x}Sr_xCoO_{3-\delta}$ (SSC), $BaZr_{1-x-y-z}Co_xFe_yY_zO_{3-\delta}$, or $SrSc_xNd_yCo_{1-x-y}O_{3-\delta}$, wherein x, y, and z are dopant levels and δ is the oxygen deficit; a Ruddelson-Popper-type perovskite material, such as $M_2NiO_{4-\delta}$, wherein δ is the oxygen deficit and M is La, Pr, Gd, or Sm (e.g., $La_2NiO_4-\delta$, $Pr_2NiO_4-\delta$, $Gd_2NiO_4-\delta$, $Sm_2NiO_4-\delta$); and a single perovskite/perovskite composite material such as SSC—BZCYYb. In addition, the negative electrode 112 may, for example, comprise a cermet material comprising at least one metal (e.g., Ni) and at least one perovskite, such as a nickel/perovskite cermet (Ni-perovskite) material (e.g., Ni—BZCYYb, Ni—BSNYYb, Ni—$BaCeO_3$, Ni—$BaZrO_3$, Ni—$Ba_2(YSn)O_{5.5}$, Ni—$Ba_3(CaNb_2)O_9$). In some embodiments, the proton-conducting membrane 110 comprises BZCYYb, the positive electrode 108 comprises SSC—BZCYYb, and the negative electrode 112 comprises Ni—BZCYYb.

As another non-limiting example, if the proton-conducting membrane 110 comprises a solid acid material (e.g., a doped $CsH_2PO_4$, an undoped $CsH_2PO_4$) having an operational temperature within a range of from about 200° C. to about 400° C., the positive electrode 108 may comprise one or more of a metal, an alloy, and an oxide compatible with the solid acid material of the proton-conducting membrane 110, and the negative electrode 112 may comprise a cermet comprising at least one metal and at least one solid acid compatible with the solid acid material of the proton-conducting membrane 110. The positive electrode 108 may, for example, comprise one or more of Ni, a Ni alloy, and an Aurivillius oxide (e.g., $Bi_2Sr_2Nb_2MnO_{12-\delta}$, wherein δ is the oxygen deficit). The negative electrode 112 may, for example, comprise a precious metal/solid acid cermet (e.g., Pt—$CsH_2PO_4$).

As another non-limiting example, if the proton-conducting membrane 110 comprises a PBI material (e.g., a doped PBI) having an operational temperature within a range of from about 150° C. to about 250° C., the positive electrode 108 and the negative electrode 112 may individually comprise one or more of metals and alloys compatible with the PBI material of the proton-conducting membrane 110. The positive electrode 108 and the negative electrode 112 may, for example, comprise one or more of Ni, Pt, a Ni alloy, and a Pt alloy.

Optionally, one or more of the positive electrode 108 and the negative electrode 112 may include at least one additional catalyst material thereon, thereover, and/or therein. As used herein, the terms "catalyst material" and "catalyst" each mean and include a material formulated to promote one or more reactions, resulting in the formation of a product. For example, an additional catalyst material may be included on, over, and/or within the material of the positive electrode 108 to accelerate reaction rates within the positive electrode 108 to produce $O_{2(g)}$, $H^+$, and $e-$ from $H_2O_{(g)}$ in accordance with Equation (1) above. In some embodiments, a Pr—Ni—Fe oxide is provided on, over, and/or within the positive electrode 108 to accelerate oxygen evolution reaction (OER) rates therein. As another example, a catalyst material may be included on, over, and/or within the material of the negative electrode 112 to accelerate reaction rates within the negative electrode 112 to produce a desired product from $H^+$, $e-$, and one or more of $CO_2$, $CO_2$ hydrogenation product(s), and reaction product(s) of $CO_2$ and/or $CO_2$ hydrogenation product(s) and one or more other materials. In some embodiments, one or more of Cu, Fe, Ni, Co, a platinum group metal (PGM) (e.g., Pt, Pd, Rh), oxides thereof, or combinations thereof is provided on, over, and/or within the negative electrode 112 to accelerate hydrogenation reaction rates at the negative electrode 112. In additional embodiments, nano-sized (e.g., having a cross-sectional width or diameter less than about one (1) µm, such as less than or equal to about 100 nanometers (nm), less than or equal to about 20 nm, or less than or equal to about 10 nm) particles (e.g., Cu particles) are provided on, over, and/or within the negative electrode 112 to promote reaction rates therein.

The positive electrode 108 and the negative electrode 112 may individually exhibit any desired dimensions (e.g., length, width, thickness) and any desired shape (e.g., a cubic shape, cuboidal shape, a tubular shape, a tubular spiral shape, a spherical shape, a semi-spherical shape, a cylindrical shape, a semi-cylindrical shape, a conical shape, a triangular prismatic shape, a truncated version of one or more of the foregoing, and irregular shape). The dimensions and the shapes of the positive electrode 108 and the negative electrode 112 may be selected relative to the dimensions and the shape of the proton-conducting membrane 110 such that the proton-conducting membrane 110 substantially intervenes between opposing surfaces of the positive electrode 108 and the negative electrode 112. Thicknesses of the positive electrode 108 and the negative electrode 112 may individually be within a range of from about 10 µm to about 1000 µm.

The electrolysis cell 106, including the positive electrode 108, the proton-conducting membrane 110, and the negative electrode 112 thereof, may be formed through conventional processes (e.g., rolling processes, milling processes, shaping processes, pressing processes, consolidation processes, etc.), which are not described in detail herein. The electrolysis cell 106 may be mono-faced or bi-faced and may have a prismatic, folded, wound, cylindrical, or jelly rolled configuration. The electrolysis cell 106 may be placed within the housing structure 114 to form the electrochemical apparatus 104, and may be electrically connected to the power source 116.

Although the electrochemical apparatus 104 is depicted as including a single (i.e., only one) electrolysis cell 106 in FIG. 1, the electrochemical apparatus 104 may include any number of electrolysis cells 106. Put another way, the electrochemical apparatus 104 may include a single (e.g., only one) electrolysis cell 106, or may include multiple (e.g., more than one) electrolysis cells 106. If the electrochemical apparatus 104 includes multiple electrolysis cells 106, each of the electrolysis cells 106 may be substantially the same (e.g., exhibit substantially the same components, component sizes, component shapes, component material compositions, component material distributions, component positions, component orientations, etc.) and may be operated under substantially the same conditions (e.g., substantially the same temperatures, pressures, flow rates, etc.), or at least one of the electrolysis cells 106 may be different (e.g., exhibit one or more of different components, different component sizes, different component shapes, different component material compositions, different component material distributions, different component positions, different component orientations, etc.) than at least one other of the electrolysis cells 106 and/or may be operated under different conditions (e.g., different temperatures, different pressures, different flow rates, etc.) than at least one other of the electrolysis cells 106. By way of non-limiting example, one of the electrolysis cells 106 may be configured for and operated under a different temperature (e.g., different operating temperature resulting from a different material composition of one or more components thereof, such as a different material composition of the proton-conducting membrane 110 thereof) than at least one other of the electrolysis cells 106. In some embodiments, two or more electrolysis cells 106 are provided in parallel with one another within the housing structure 114 of the electrochemical apparatus 104, and may individually produce a portion of the $CO_2$ hydrogenation products (and/or derivatives thereof) directed out of the electrochemical apparatus 104 as the product stream 128.

In addition, although the $CO_2$ hydrogenation system 100 is depicted as including a single (i.e., only one) electrochemical apparatus 104 in FIG. 1, the $CO_2$ hydrogenation system 100 may include any number of electrochemical apparatuses 104. Put another way, the $CO_2$ hydrogenation system 100 may include a single (e.g., only one) electrochemical apparatuses 104, or may include multiple (e.g., more than one) electrochemical apparatuses 104. If the $CO_2$ hydrogenation system 100 includes multiple electrochemical apparatuses 104, each of the electrochemical apparatuses 104 may be substantially the same (e.g., exhibit substantially the same components, component sizes, component shapes, component material compositions, component material distributions, component positions, component orientations, etc.) and may be operated under substantially the same conditions (e.g., substantially the same temperatures, pressures, flow rates, etc.), or at least one of the electrochemical apparatus 104 may be different (e.g., exhibit one or more of different components, different component sizes, different component shapes, different component material compositions, different component material distributions, different component positions, different component orientations, etc.) than at least one other of the electrochemical apparatuses 104 and/or may be operated under different conditions (e.g., different temperatures, different pressures, different flow rates, etc.) than at least one other of the electrochemical apparatuses 104. By way of non-limiting example, one of the electrochemical apparatuses 104 may be configured for and operated under a different temperature (e.g., a different operating temperature resulting from a different material composition of one or more components of an electrolysis cell 106 thereof, such as a different material composition of the proton-conducting membrane 110 thereof) than at least one other of the electrochemical apparatuses 104. In some embodiments, two or more electrochemical apparatuses 104 are provided in parallel with one another. Each of the two or more electrochemical apparatuses 104 may individually receive a gaseous $H_2O$ stream 122 and a $CO_2$ stream 126 and individually form a product stream 128. In additional embodiments, two or more electrochemical apparatuses 104 are provided in series with one another. One of the two or more electrochemical apparatuses 104 may receive a gaseous $H_2O$ stream 122 and a $CO_2$ stream 126 and may form an initial product stream 128 therefrom, and another of the two or more electrochemical apparatuses 104 may receive another gaseous $H_2O$ stream 122 and the initial product stream 128 (e.g., as a substitute for another $CO_2$ stream 126) and may form another product stream 128 therefrom.

Still referring to FIG. 1, the gaseous $O_2$ stream 124 and the product stream 128 exiting the electrochemical apparatus 104 may individually be utilized or disposed of as desired. In some embodiments, the gaseous $O_2$ stream 124 is vented, and the product stream 128 is delivered into one or more storage vessels for subsequent use, as desired. In additional embodiments, at least a portion of one or more of the gaseous $O_2$ stream 124 and the product stream 128 may be utilized (e.g., combusted) to heat one or more components (e.g., a steam generator 102; the heating apparatus 118 (if present); the electrochemical apparatus 104; etc.) and/or streams (e.g., the liquid $H_2O$ stream 120, the gaseous $H_2O$ stream 122, the $CO_2$ stream 126, etc.) of the $CO_2$ hydrogenation system 100. By way of non-limiting example, as shown in FIG. 1, if one or more of the steam generator 102 and the heating apparatus 118 (if present) is a combustion-based apparatus, at least a portion of one or more of the gaseous $O_2$ stream 124 and the product stream 128 may be directed into the steam generator 102 and/or the heating apparatus 118 and undergo an combustion reaction to efficiently heat one or more of the liquid $H_2O$ stream 120 entering the steam generator 102, the gaseous $H_2O$ stream 122 exiting the steam generator 102, and at least a portion of the electrochemical apparatus 104. Utilizing the gaseous $O_2$ stream 124 and/or the product stream 128 as described above may reduce the electrical power requirements of the $CO_2$ hydrogenation system 100 by enabling the utilization of direct thermal energy.

Thermal energy input into (e.g., through gaseous $H_2O$ stream 122, and the heating apparatus 118 (if present)) and/or generated by the electrochemical apparatus 104 may also be used to heat one or more other components (e.g., the steam generator 102; the heating apparatus 118 (if present); etc.) and/or streams (e.g., the liquid $H_2O$ stream 120, the gaseous $H_2O$ stream 122, the $CO_2$ stream 126, etc.) of the $CO_2$ hydrogenation system 100. By way of non-limiting example, the gaseous $O_2$ stream 124 and/or the product stream 128 exiting the electrochemical apparatus 104 may be directed into a heat exchanger configured and operated to facilitate heat exchange between the gaseous $O_2$ stream 124 and/or the product stream 128 of the $CO_2$ hydrogenation system 100 and one or more other relatively cooler streams (e.g., the liquid $H_2O$ stream 120, the gaseous $H_2O$ stream 122, the $CO_2$ stream 126) of the $CO_2$ hydrogenation system 100 to transfer heat from the gaseous $O_2$ stream 124 and/or the product stream 128 to the relatively cooler stream(s) to facilitate the recovery of the thermal energy input into and generated within the electrochemical apparatus 104. The recovered thermal energy may increase process efficiency and/or reduce operational costs without having to react (e.g., combust) $O_{2(g)}$ of the gaseous $O_2$ stream 124 and/or components of the product stream 128.

The methods, systems (e.g., the $CO_2$ hydrogenation system 100), and apparatuses (e.g., the electrochemical apparatus 104, including the electrolysis cell 106 thereof) of the disclosure facilitate simple and efficient $CO_2$ hydrogenation using $H_2O$ electrolysis at intermediate temperatures, such as temperatures within a range of from about 150° C. to about 650° C. The methods, systems, and apparatuses of the disclosure may reduce one or more of the time (e.g., processing steps), costs (e.g., material costs), and energy (e.g., thermal energy, electrical energy, etc.) required to synthesize one or more desirable products from $CO_2$ relative to conventional methods, systems, and apparatuses of synthesizing the products. Accordingly, the methods, systems, and apparatuses of the disclosure may be more efficient, durable, and reliable than conventional methods, conventional systems, and conventional apparatuses of synthesizing one or more desirable products from $CO_2$.

Additional non-limiting examples of embodiments of the disclosure are set forth below.

Embodiment 1: A method of carbon dioxide hydrogenation comprises introducing gaseous water to a positive electrode of an electrolysis cell comprising the positive electrode, a negative electrode, and a proton-conducting membrane between the positive electrode and the negative electrode, the proton-conducting membrane comprising an electrolyte material having an ionic conductivity greater than or equal to about $10^{-2}$ S/cm at one or more temperatures within a range of from about 150° C. to about 650° C. Carbon dioxide is introduced to the negative electrode of the electrolysis cell. A potential difference is applied between the positive electrode and the negative electrode of the electrolysis cell to generate hydrogen ions from the gaseous water that diffuse through the proton-conducting membrane and hydrogenate the carbon dioxide at the negative electrode.

Embodiment 2: The method of Embodiment 1, further comprising selecting the proton-conducting membrane of the electrolysis cell to comprise at least one perovskite material having a $H^+$ conductivity greater than or equal to about $10^{-2}$ S/cm at one or more temperatures within a range of from about 350° C. to about 650° C.

Embodiment 3: The method of Embodiment 2, wherein selecting the proton-conducting membrane of the electrolysis cell to comprise at least one perovskite material comprises selecting the at least one perovskite material to comprise one or more of BZCYYb, BSNYYb, BCY, BZY, $Ba_2(YSn)O_{5.5}$, and $Ba_3(CaNb_2)O_9$.

Embodiment 4: The method of Embodiment 2 or Embodiment 3, wherein selecting the proton-conducting membrane of the electrolysis cell to comprise at least one perovskite material comprises selecting the proton-conducting membrane to comprise a stack of at least two different perovskite materials each individually having a $H^+$ conductivity greater than or equal to about $10^{-2}$ S/cm at one or more temperatures within a range of from about 350° C. to about 650° C.

Embodiment 5: The method of any one of Embodiments 2 through 4, further comprising selecting the positive electrode to comprise one or more of a double perovskite material, a single perovskite material, a Ruddelsen-Popper-type perovskite material, and a composite material comprising at least two different perovskite materials; and selecting the negative electrode to comprise a cermet material comprising at least one metal and at least one perovskite.

Embodiment 6: The method of Embodiment 1, further comprising selecting the proton-conducting membrane of the electrolysis cell to comprise at least one solid acid material having a $H^+$ conductivity greater than or equal to about $10^{-2}$ S/cm at one or more temperatures within a range of from about 200° C. to about 400° C.

Embodiment 7: The method of Embodiment 6, further comprising selecting the positive electrode to comprise one or more of Ni, a Ni alloy, and an Aurivillius oxide; and selecting the negative electrode to comprise a cermet material comprising Ni and at least one solid acid.

Embodiment 8: The method of Embodiment 1, further comprising selecting the proton-conducting membrane of the electrolysis cell to comprise at least one PBI material having a H⁺ conductivity greater than or equal to about $10^{-2}$ S/cm at one or more temperatures within a range of from about 150° C. to about 250° C.

Embodiment 9: The method of Embodiment 8, further comprising selecting the positive electrode and the negative electrode to individually comprise one or more of Ni, Pt, a Ni alloy, and a Pt alloy.

Embodiment 10: The method of any one of Embodiments 1 through 9, wherein introducing gaseous water to a positive electrode of an electrolysis cell comprises exposing the positive electrode of the electrolysis cell to the gaseous water without exposing the negative electrode of the electrolysis cell to the gaseous water.

Embodiment 11: The method of any one of Embodiments 1 through 10, further comprising heating the gaseous water to a temperature within the range of from about 150° C. to about 650° C. effectuating the ionic conductivity greater than about $10^{-2}$ S/cm within the proton-conducting membrane prior to applying a potential difference between the positive electrode and the negative electrode of the electrolysis cell.

Embodiment 12: A carbon dioxide hydrogenation system comprises a source of liquid water, a source of carbon dioxide, a steam generator, and an electrochemical apparatus. The steam generator is configured and positioned to receive a liquid water stream from the source of liquid water and to generate a gaseous water stream therefrom. The electrochemical apparatus is in fluid communication with the steam generator and the source of carbon dioxide and comprises a housing structure and an electrolysis cell. The housing structure is configured and positioned to receive the gaseous water stream from the steam generator into a first region of an internal chamber thereof and to receive a carbon dioxide stream from the source of carbon dioxide into a second region of the internal chamber thereof. The electrolysis cell is within the internal chamber of the housing structure and comprises a positive electrode adjacent the first region of the internal chamber, a negative electrode adjacent the second region of the internal chamber, and a proton-conducting membrane between the positive electrode and the negative electrode and comprising an electrolyte material having an ionic conductivity greater than or equal to about $10^{-2}$ S/cm at one or more temperatures within a range of from about 150° C. to about 650° C.

Embodiment 13: The carbon dioxide hydrogenation system of Embodiment 12, wherein the housing structure and the electrolysis cell are configured and positioned to expose the positive electrode of the electrolysis cell to the gaseous water stream without exposing the negative electrode to the gaseous water stream.

Embodiment 14: The carbon dioxide hydrogenation system of Embodiment 12 or Embodiment 13, further comprising at least one heating apparatus operatively associated with the electrochemical apparatus and configured to heat the gaseous water stream to a temperature within the range of from about 150° C. to about 650° C.

Embodiment 15: The carbon dioxide hydrogenation system of Embodiment 12 or Embodiment 13, wherein the electrolyte material of the proton-conducting membrane comprises a perovskite material having a H⁺ conductivity greater than about $10^{-2}$ S/cm at one or more temperatures within a range of from about 350° C. to about 650° C.

Embodiment 16: The carbon dioxide hydrogenation system of Embodiment 12 or Embodiment 13, wherein the electrolyte material of the proton-conducting membrane comprises a solid acid material having a H⁺ conductivity greater than or equal to about $10^{-2}$ S/cm at one or more temperatures within a range of from about 200° C. to about 400° C.

Embodiment 17: The carbon dioxide hydrogenation system of Embodiment 12 of Embodiment 13, wherein the electrolyte material of the proton-conducting membrane comprises a PBI material having a H⁺ conductivity greater than or equal to about $10^{-2}$ S/cm at one or more temperatures within a range of from about 150° C. to about 250° C.

Embodiment 18: The carbon dioxide hydrogenation system of any one of Embodiments 12 through 17, wherein the positive electrode and the negative electrode are formulated to remain substantially adhered to the proton-conducting membrane at current densities greater than or equal to about 0.1 A/cm².

While the disclosure is susceptible to various modifications and alternative forms, specific embodiments have been shown by way of example in the drawing and have been described in detail herein. However, the disclosure is not limited to the particular forms disclosed. Rather, the disclosure is to cover all modifications, equivalents, and alternatives falling within the scope of the following appended claims and their legal equivalent. For example, elements and features disclosed in relation to one embodiment may be combined with elements and features disclosed in relation to other embodiments of the disclosure.

What is claimed is:

1. A method of carbon dioxide hydrogenation, comprising:
   introducing gaseous water to a positive electrode of an electrolysis cell comprising the positive electrode, a negative electrode, and a proton-conducting membrane between the positive electrode and the negative electrode,
   the proton-conducting membrane comprising at least one perovskite material having an ionic conductivity greater than or equal to about $10^{-2}$ S/cm at one or more temperatures within a range of from about 150° C. to about 650° C. and selected to comprise one or more of yttrium- and ytterbium-doped barium-zirconate-cerate (BZCYYb), yttrium- and ytterbium-doped barium-strontium-niobate (BSNYYb), and $Ba_2(YSn)O_{5.5}$, and
   the positive electrode selected to comprise one or more of $MBa_{1-x}Sr_xCo_{2-y}Fe_yO_{5+\delta}$ and $A_2NiO_{4-\delta}$, where:
   M is Pr, Nd, or Sm,
   A is La, Pr, Gd, or Sm,
   x and y are dopant levels, and
   δ is oxygen deficit
   introducing carbon dioxide to the negative electrode of the electrolysis cell; and
   applying a potential difference between the positive electrode and the negative electrode of the electrolysis cell to generate hydrogen ions from the gaseous water that diffuse through the proton-conducting membrane and hydrogenate the carbon dioxide at the negative electrode.

2. The method of claim 1, further comprising selecting the at least one perovskite material to have a H⁺ conductivity greater than or equal to about $10^{-2}$ S/cm at one or more temperatures within a range of from about 350° C. to about 650° C.

3. The method of claim 2, further comprising selecting the at least one perovskite material to comprise a stack of at least two different perovskite materials each individually having the H⁺ conductivity greater than or equal to about $10^{-2}$ S/cm at the one or more temperatures within the range of from about 350° C. to about 650° C., at least one of the at least two different perovskite materials comprising the one or more of yttrium- and ytterbium-doped barium-zirconate-cerate (BZCYYb), the yttrium- and ytterbium-doped barium-strontium-niobate (BSNYYb), and the $Ba_2(YSn)O_{5.5}$.

4. The method of claim 2, further comprising selecting the negative electrode to comprise a cermet material comprising at least one metal and at least one perovskite.

5. The method of claim 1, wherein introducing gaseous water to a positive electrode of an electrolysis cell comprises exposing the positive electrode of the electrolysis cell to the gaseous water without exposing the negative electrode of the electrolysis cell to the gaseous water.

6. The method of claim 1, further comprising heating the gaseous water to a temperature within the range of from about 150° C. to about 650° C. effectuating the ionic conductivity greater than about $10^{-2}$ S/cm within the proton-conducting membrane prior to applying a potential difference between the positive electrode and the negative electrode of the electrolysis cell.

7. The method of claim 1, further comprising selecting the at least one perovskite material to comprise the yttrium- and ytterbium-doped barium-zirconate-cerate (BZCYYb).

8. The method of claim 1, further comprising selecting the at least one perovskite material to comprise the $Ba_2(YSn)O_{5.5}$.

9. The method of claim 1, further comprising selecting the proton-conducting membrane to have a thickness within a range of from about 5 μm to about 1000 μm.

10. The method of claim 1, further comprising selecting the proton-conducting membrane to be substantially homogeneous.

11. The method of claim 1, further comprising selecting the positive electrode to comprise the $MBa_{1-x}Sr_xCo_{2-y}Fe_yO_{5+\delta}$.

12. The method of claim 11, further comprising selecting the positive electrode to comprise the $MBa_{1-x}Sr_xCo_{2-y}Fe_yO_{5+\delta}$, wherein the $MBa_{1-x}Sr_xCo_{2-y}Fe_yO_{5+\delta}$ is selected from the group comprising $PrBa_{0.5}Sr_{0.5}Co_{1.5}Fe_{0.5}O_{5+\delta}$, $NdBa_{0.5}Sr_{0.5}Co_{1.5}Fe_{0.5}O_{5+\delta}$, and $SmBa_{0.5}Sr_{0.5}Co_{1.5}Fe_{0.5}O_{5+\delta}$.

13. The method of claim 1, further comprising selecting the positive electrode to comprise the $A_2NiO_{4-\delta}$.

14. The method of claim 1, further comprising selecting the negative electrode to comprise a cermet material comprising nickel and one of yttrium- and ytterbium-doped barium-zirconate-cerate (BZCYYb), yttrium- and ytterbium-doped barium-strontium-niobate (BSNYYb), and $Ba_2(YSn)O_{5.5}$.

15. A method of carbon dioxide hydrogenation, comprising:
introducing gaseous water to a positive electrode of an electrolysis cell comprising the positive electrode, a negative electrode, and a proton-conducting membrane between the positive electrode and the negative electrode, the proton-conducting membrane comprising at least one perovskite material having an ionic conductivity greater than or equal to about $10^{-2}$ S/cm at one or more temperatures within a range of from about 150° C. to about 650° C. and selected to comprise yttrium- and ytterbium-doped barium-strontium-niobate (BSNYYb);
introducing carbon dioxide to the negative electrode of the electrolysis cell; and
applying a potential difference between the positive electrode and the negative electrode of the electrolysis cell to generate hydrogen ions from the gaseous water that diffuse through the proton-conducting membrane and hydrogenate the carbon dioxide at the negative electrode.

* * * * *